United States Patent
Kagose et al.

(10) Patent No.: US 10,029,485 B2
(45) Date of Patent: Jul. 24, 2018

(54) INK JET RECORDING METHOD

(71) Applicant: Seiko Epson Corporation, Tokyo (JP)

(72) Inventors: Taketoshi Kagose, Shiojiri (JP); Satoru Miura, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/367,771

(22) Filed: Dec. 2, 2016

(65) Prior Publication Data
US 2017/0080719 A1 Mar. 23, 2017

Related U.S. Application Data

(63) Continuation of application No. 14/817,935, filed on Aug. 4, 2015, now Pat. No. 9,539,823, which is a (Continued)

(30) Foreign Application Priority Data

Jul. 9, 2010 (JP) ................................ 2010-156579

(51) Int. Cl.
*B41J 2/01* (2006.01)
*B41J 11/00* (2006.01)
(Continued)

(52) U.S. Cl.
CPC ............... *B41J 11/002* (2013.01); *B41J 2/01* (2013.01); *B41J 11/0015* (2013.01);
(Continued)

(58) Field of Classification Search
None
See application file for complete search history.

(56) References Cited

U.S. PATENT DOCUMENTS 6,312,123 B1   11/2001   Codos et al.
7,249,835 B2   7/2007    Hoshino et al.
(Continued)

FOREIGN PATENT DOCUMENTS

JP   2004-188777 A   7/2004
JP   2004-195966 A   7/2004
(Continued)

OTHER PUBLICATIONS

Search Report in EPO Application 11173010.7 dated Dec. 3, 2012.

*Primary Examiner* — Matthew Luu
*Assistant Examiner* — Tracey McMillion
(74) *Attorney, Agent, or Firm* — Harness, Dickey & Pierce, P.L.C.

(57) ABSTRACT

An ink jet recording method uses an ink jet recording apparatus including a plurality of heads arranged in parallel in a first direction, each of which ejects droplets of a different radiation-curable ink composition onto a recording medium, and first light sources provided for corresponding heads so as to be disposed at a predetermined side of the corresponding heads. The first light sources emit active radiation to irradiate the droplets on the recording medium. The method includes ejecting droplets of the ink compositions from the heads onto the recording medium, and performing a first irradiation by irradiating the droplets of each ink composition with the active radiation from the corresponding first light source at an irradiation energy within 500 ms after the droplets have landed. The irradiation energy is in the range of 5% to 10% of the energy $E_{90}$ at which the ink composition is 90% cured.

16 Claims, 4 Drawing Sheets

Related U.S. Application Data continuation of application No. 14/071,120, filed on Nov. 4, 2013, now Pat. No. 9,126,431, which is a continuation of application No. 13/176,223, filed on Jul. 5, 2011, now Pat. No. 8,602,519.

(51) Int. Cl.
*B41M 7/00* (2006.01)
*C09D 11/101* (2014.01)
*C09D 11/322* (2014.01)

(52) U.S. Cl.
CPC ......... *B41M 7/0081* (2013.01); *C09D 11/101* (2013.01); *C09D 11/322* (2013.01)

(56) References Cited

U.S. PATENT DOCUMENTS

| | | |
|---|---|---|
| 7,488,065 B2 | 2/2009 | Yokoyama |
| 8,454,152 B2 | 6/2013 | Kobayashi et al. |
| 2003/0035037 A1 | 2/2003 | Mills et al. |
| 2003/0189609 A1* | 10/2003 | Ishikawa ............ B41J 2/04531 347/11 |
| 2003/0222961 A1 | 12/2003 | Nakajima |
| 2004/0119772 A1 | 6/2004 | Hoshino et al. |
| 2006/0066704 A1* | 3/2006 | Nishida ................. B41J 2/0057 347/103 |
| 2006/0192829 A1 | 8/2006 | Mills et al. |
| 2007/0273739 A1* | 11/2007 | Rodin ................... B41J 11/002 347/102 |
| 2008/0068431 A1 | 3/2008 | Yokoyama |
| 2008/0180503 A1* | 7/2008 | Umebayashi ........ C09D 11/101 347/102 |
| 2010/0039463 A1* | 2/2010 | Van Thillo .......... C09D 11/101 347/9 |
| 2010/0137509 A1* | 6/2010 | Shimohara .......... C09D 11/101 524/612 |

FOREIGN PATENT DOCUMENTS

| | | |
|---|---|---|
| JP | 2007-276248 A | 10/2007 |
| JP | 2008-073916 A | 4/2008 |
| JP | 4147943 B2 | 9/2008 |
| JP | 2009-056695 A | 3/2009 |
| WO | WO-2009-157262 A1 | 12/2009 |

* cited by examiner

INK JET RECORDING METHOD

CROSS-REFERENCE TO RELATED APPLICATIONS

Cross Reference

This is a continuation application of U.S. patent application Ser. No. 14/817,935, filed on Aug. 4, 2015, which is a continuation application of U.S. patent application Ser. No. 14/071,120, filed on Nov. 4, 2013, now U.S. Pat. No. 9,126,431, issued on Sep. 8, 2015, which is a continuation application of U.S. patent application Ser. No. 13/176,223, filed on Jul. 5, 2011, now U.S. Pat. No. 8,602,519, issued on Dec. 10, 2013, which claims priority to Japanese Patent Application No. 2010-156579, filed on Jul. 9, 2010, all of which are expressly incorporated by reference herein in their entireties.

BACKGROUND

Technical Field

The present invention relates to an ink jet recording method and an ink jet recording apparatus used in the method.

Related Art

Radiation-curable inks that can be cured by being irradiated with UV rays, electron beams, or other radiation are being developed. These radiation-curable inks are used for recording on ink-non-absorbent recording media that do not absorb or hardly absorb ink, such as plastic or glass media and coated paper, because radiation-curable ink compositions can be dried quickly. For example, a radiation-curable ink contains a polymerizable monomer, a polymerization initiator, a pigment, and other additives.

It is known that such a radiation-curable ink can be used to form an image by ejecting droplets of the ink onto a recording medium from an ink jet recording apparatus, and irradiating the droplets with active radiation to cure the ink.

For example, JP-A-2007-276248 discloses a method in which inks are deposited by an ink jet recording apparatus including a single head and active energy beam irradiation devices at both sides of the head, and are then irradiated with active energy beams in order of ease of curing.

Japanese Patent No. 4147943 discloses a method in which an ink is ejected onto a recording medium from an ink jet recording apparatus including a head and irradiation devices at both sides of the head, and is then irradiated with active radiation. In this method, the irradiation energy of the active radiation first irradiated is adjusted so that the ink can be cured to a predetermined degree.

JP-A-2008-73916 and JP-A-2009-56695 each disclose an ink jet recording apparatus including a plurality of recording heads and light sources each disposed between adjacent recording heads.

However, in the method disclosed in JP-A-2007-276248, if printing is performed with a plurality of irradiation-curable ink compositions that are cured at different irradiation energies, the printing speed may be reduced to the extent that it is considered to be unacceptable in practical use.

In the method disclosed in Japanese Patent No. 4147943, even when a plurality of irradiation-curable ink compositions that are cured at different irradiation energies are used for printing, all the ink compositions are irradiated at the same energy. Accordingly, the resulting image on a recording medium may be unsatisfactory in glossiness or color density, or bleeding may occur in the image.

JP-A-2008-73916 and JP-A-2009-56695 do not disclose the irradiation energy or the irradiation timing at which the inks from the plurality of heads are first irradiated. Consequently, the resulting image on a recording medium may be unsatisfactory in glossiness or color density, or bleeding may occur in the image.

SUMMARY

An advantage of some aspect of the invention is that it provides an ink jet recording method that can produce images having a high glossiness and a high color density while reducing bleeding in the images.

The following embodiments of the invention can solve at least some of the above issues.

According to an aspect of the invention, an ink jet recording method is provided which uses an ink jet recording apparatus including a plurality of heads arranged in parallel in a first direction, each of which ejects droplets of a different radiation-curable ink composition onto a recording medium, and first light sources provided for corresponding heads so as to be disposed at a predetermined side of the corresponding heads. The first light sources emit active radiation to irradiate the droplets on the recording medium. The method includes ejecting droplets of the ink compositions from the heads onto the recording medium, and performing a first irradiation by irradiating the droplets of each ink composition with the active radiation from the corresponding first light source at an irradiation energy within 500 ms after the droplets have landed on the recording medium. The irradiation energy is in the range of 5% to 10% of the energy $E_{90}$ at which the ink composition is 90% cured.

In this method, the first light sources are provided for corresponding heads, and the irradiation timing and the irradiation energy of each first light source are set as above. Consequently, an image superior in glossiness and color density can be formed, and bleeding in the image can be reduced.

The first light source may include an LED.

The use of LEDs can prevent the decrease in intensity of the active radiation thus allows the radiation-curable ink compositions to be efficiently cured, without increasing the size of the first light sources.

The method may further include performing a second irradiation to irradiate the droplets with active radiation after 500 ms has elapsed from the landing of the droplets.

The droplets can be fully cured by this operation.

In this instance, the total energy of irradiations of the droplets with active radiation including the first irradiation and the second irradiation may be more than or equal to E.sub.90.

Consequently, the droplets can be fully cured, and, accordingly, the rub fastness of the resulting image can be enhanced.

The ink jet recording apparatus may further include a carriage that contains the heads and the first light source and reciprocally moves in the first direction, and the ejection of the droplets and the first irradiation are performed while the carriage is reciprocally moved.

In this instance, the method can be applied to serial ink jet recording apparatuses.

The irradiation energy $E_{90}$ may be in the range of 120 to 300 $mJ/cm^2$.

Radiation-curable ink compositions that can be 90% cured at an irradiation energy in this range can be used in the ink jet recording apparatus used in the method.

According to another aspect of the invention, an ink jet recording apparatus used in the above method is provided. The ink jet recording apparatus includes a plurality of heads arranged in parallel in a first direction, each of which ejects droplets of a different radiation-curable ink composition onto a recording medium, and first light sources provided for corresponding heads so as to be disposed at a predetermined side of the corresponding heads. The first light sources emit active radiation so as to irradiate the droplets on the recording medium.

In this structure, since the first light sources are provided for corresponding heads, the irradiation energy of the active radiation first irradiating the droplets can be optimized. Consequently, an image superior in glossiness and color density can be formed, and bleeding in the image can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will now be described. The embodiments disclosed below are described as examples of the invention. The invention is not limited to the disclosed embodiments, and various modifications may be made within the scope and spirit of the invention.

1. First Embodiment

An ink jet recording apparatus used in an ink jet recording method according to the present embodiment of the invention includes a plurality of heads arranged in parallel in a first direction. Each head ejects droplets of a different radiation-curable ink composition onto a recording medium. The apparatus also includes first light sources provided for corresponding heads so as to be disposed at a predetermined side of the corresponding heads. The light sources emit active radiation to irradiate the droplets on the recording medium.

1.1 Ink Jet Recording Apparatus

The ink jet recording apparatus used in the ink jet recording method of the present embodiment will be described below with reference to FIGS. 1 to 4.

Figure 1:
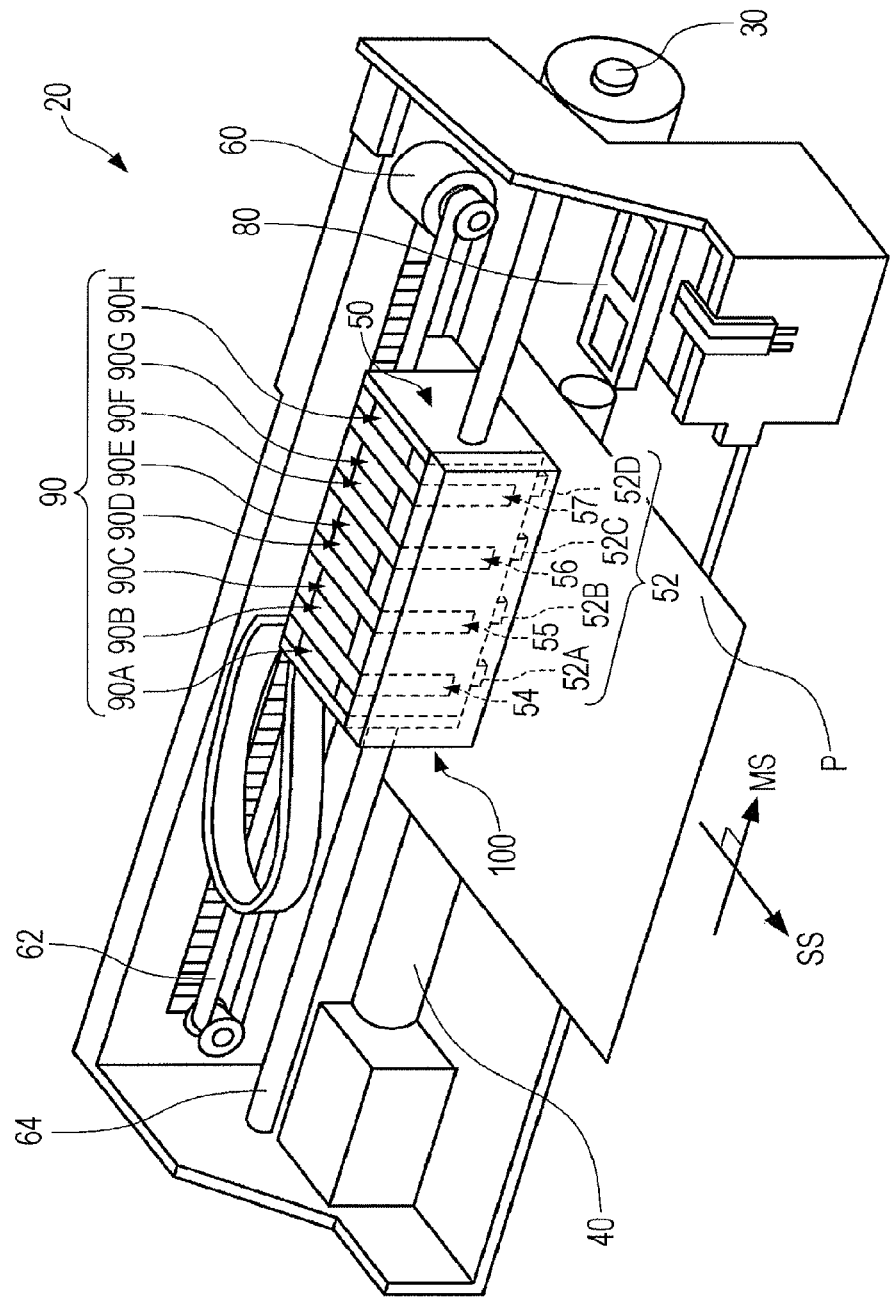
FIG. 1 is a schematic perspective view of an ink jet recording apparatus that can be used in an ink jet recording method according to a first embodiment of the invention.
Figure 2:
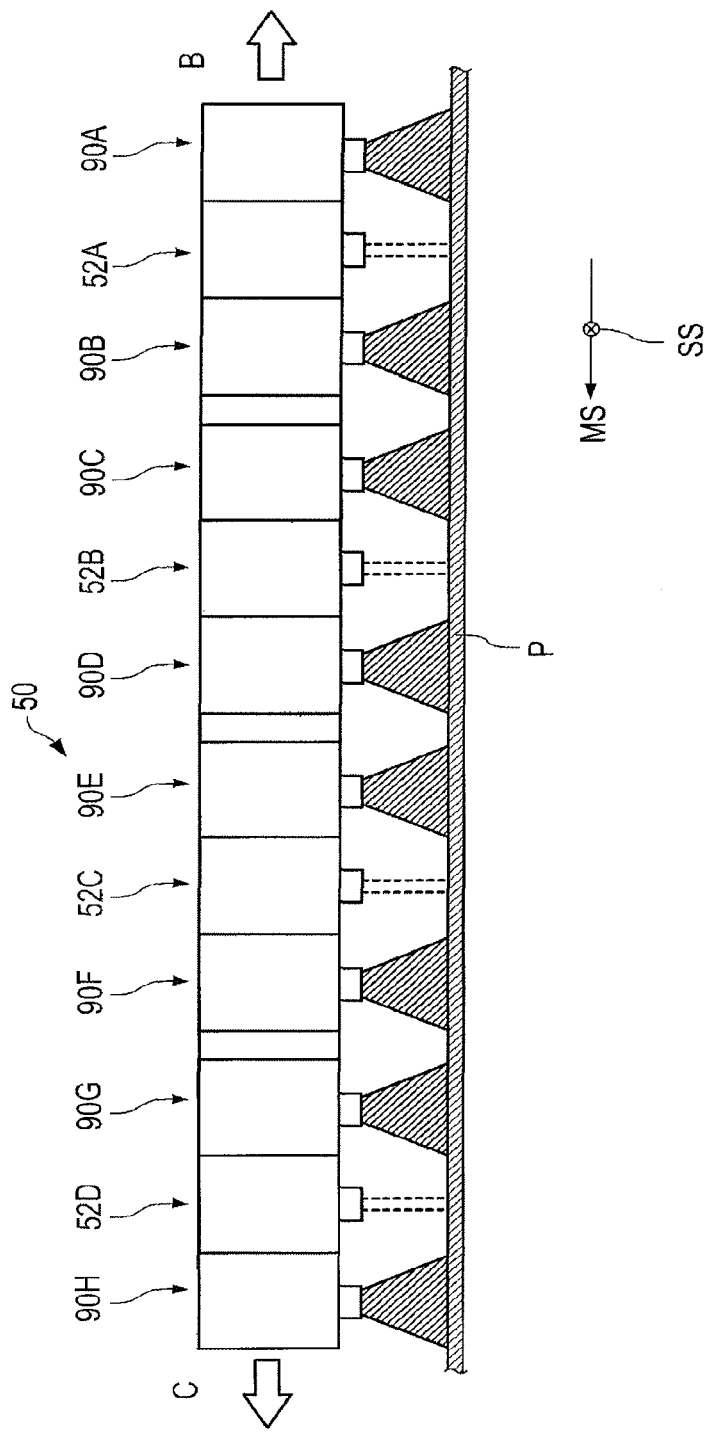
FIG. 2 is a schematic rear side view of a carriage of an ink jet recording apparatus that can be used in the ink jet recording method of the first embodiment.
Figure 3:
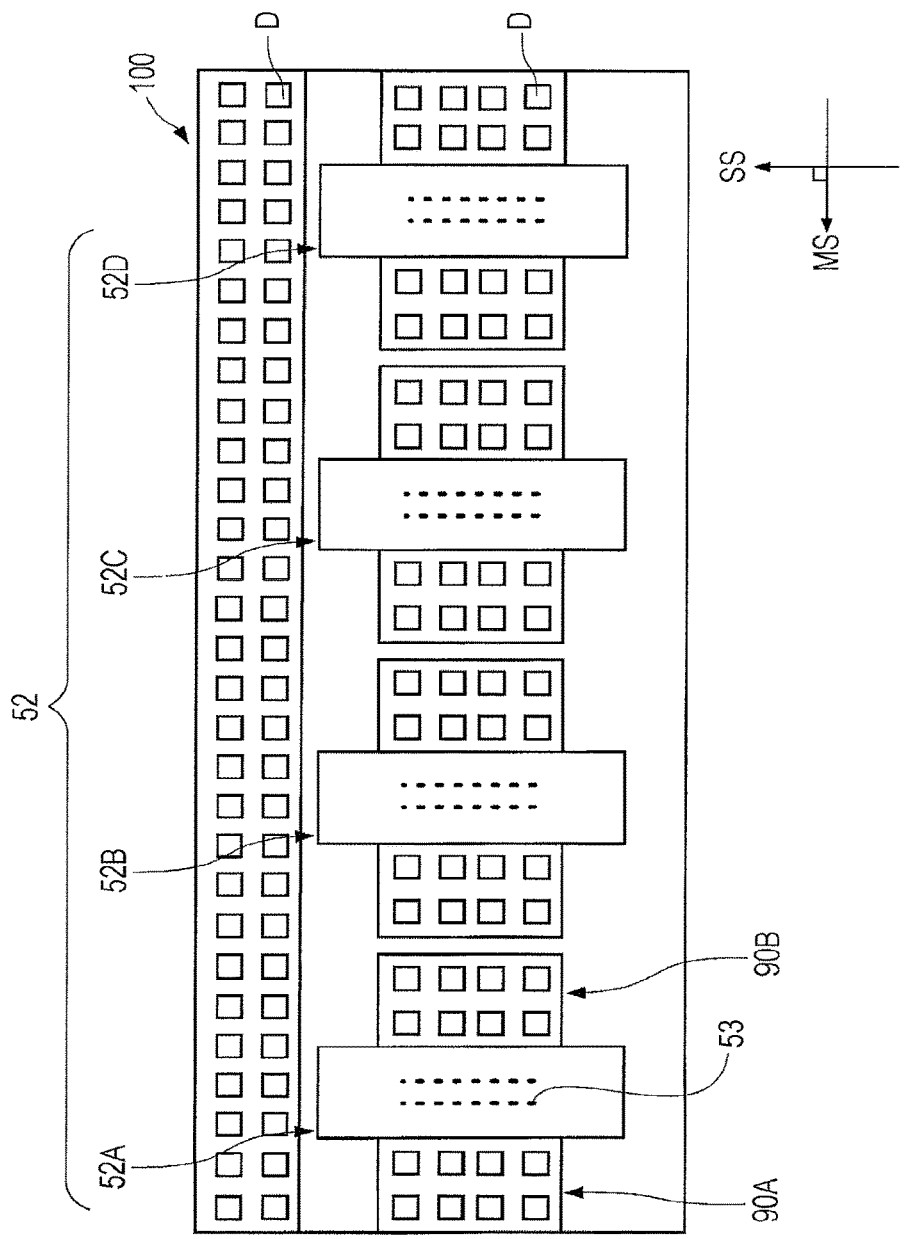
FIG. 3 is a schematic bottom view of the carriage.
Figure 4:
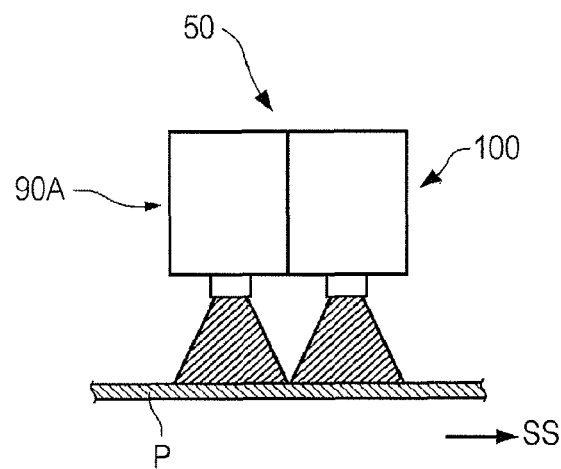
FIG. 4 is a schematic side view of the carriage.

The ink jet recording method of the present embodiment may use the ink jet recording apparatus shown in FIG. 1. FIG. 1 is a schematic perspective view of the ink jet recording apparatus. FIG. 2 shows the rear side of the carriage 50 of the ink jet recording apparatus. In this Figure, the side facing in a direction SS in which the recording medium P is transported is the front side. FIG. 3 shows the bottom of the carriage 50 when the side facing in the direction SS is the front side. FIG. 4 shows the left side of the carriage 50 when the side facing in the direction SS is the front side.

The ink jet recording apparatus 20 shown in FIG. 1 includes a plurality of heads 52, a plurality of first light sources 52, and a second light source 100.

1.1.1 Heads

The heads 52 eject droplets of radiation-curable ink compositions onto a recording medium P through nozzle apertures 53 while reciprocally moving in a first direction MS.

The heads 52 are not otherwise limited as long as they function as the above manner, and can be applied to any recording method. Recording may be performed by, for example, applying a strong electric field between the nozzles and an acceleration electrode disposed in front of the nozzles to eject ink droplets continuously through the nozzles, and transmitting a printing information signal to deflection electrodes while the droplets are flying between the deflection electrodes. Recording may be performed by electrostatic suction. In this case, ink droplets are ejected according to the printing information signal, without deflecting the ink droplets. Alternatively, an ink liquid may be forcibly ejected by pressurizing the ink liquid with a small pump and mechanically vibrating the nozzles with a quartz resonator. A piezoelectric method may be applied in which a pressure and a printing information signal are simultaneously applied to an ink liquid with a piezoelectric element, and ink droplets are thus ejected for recording. Also, a thermal jet method may be applied in which an ink liquid is foamed by heat with a miniature electrode according to a printing information signal, and ink droplets are thus ejected for printing.

In the serial ink jet recording apparatus 20, as shown in FIG. 1, the heads are reciprocally moved in the first direction MS with the reciprocal movement of the carriage 50, and a platen 40 is driven by a motor 30 to transport the recording medium P. The radiation-curable ink compositions are thus deposited at different positions on the recording medium.

The heads 52 are arranged in parallel with each other in the first direction MS. In the ink jet recording apparatus shown in FIG. 1, the heads 52 include independent heads 52A, 52B, 52C, and 52D. Although the four heads 52A to 52D are loaded in the carriage 50 in FIG. 1, at least two heads are loaded in the embodiments of the invention. Each of the heads 52A to 52D has a large number of nozzle apertures 53.

The nozzle apertures 53 are formed in the surface of the head 52 opposing the recording medium P. The head 52 ejects droplets of a radiation-curable ink composition through the nozzle apertures 53. The number and arrangement of the nozzle apertures 53 are not particularly limited. In the present embodiment, as shown in FIG. 3, the nozzle apertures 53 are formed in two lines in parallel in the first direction MS, each extending in the direction perpendicular to the first direction MS (in the recording medium transport direction SS).

The arrangement of the heads 52A to 52D is not limited to that shown in FIGS. 1 and 3. For example, a plurality of heads arranged in parallel with each other in the first direction MS, and some of the heads may be displaced in the recording medium transport direction SS.

Another two or more heads may be provided so as to be arranged in the recording medium transport direction SS together with any one of the heads 52A to 52D. In this instance, the first light sources of the additional heads may be disposed at both sides, in the first direction MS, of the respective heads. The number of heads arranged in the first direction MS is not limited to four as shown in FIGS. 1 to 3, and may be two or more.

1.1.2. First Light Source

The first light sources 90 may be moved in the first direction MS with the heads 52. The first light sources 90 move in the same manner as the heads 52, and thus description thereof is omitted.

The first light sources 90 are disposed one by one at both sides, in the first direction MS, of each head 52. In the present embodiment shown in FIG. 1, the first light sources 90 include first light sources 90A, 90B, 90C, 90D, 90E, 90F, 90G, and 90H that are provided at both sides of each head 52. The first light sources 90A to 90H have the same structure. In the following description, the first light source 90A will be described as a representative example.

As shown in FIG. 2, one first light source 90A is disposed to the right side of the head 52A (in the direction indicated by arrow B shown in FIG. 2), and another first light source 90B is disposed to the left side of the head 52A (in the direction indicated by arrow C shown in FIG. 2). Although in the present embodiment shown in FIG. 1, each head 52 is provided with two first light sources, one light source being provided at either side thereof, at least two light sources may be provided at each side of the head.

The shape of the first light source 90A is not particularly limited, and is preferably such that it can emit active radiation to the droplets of the radiation-curable ink composition on the recording medium P, which have been ejected through the nozzle apertures 53 of the head 52A, during one moving operation of the carriage 50. As shown in FIG. 3, in the present embodiment, the length of the first light source 90A is larger than the length of the lines in which the nozzle apertures 53 are arranged. The width (length in the first direction MS) of the first light source 90A and the distance between the first light source 90A and the recording medium P are arbitrarily set in view of the intensity and irradiation time of the active radiation.

The first light source 90A emits active radiation to the droplets of the radiation-curable ink composition on the recording medium P. In consideration of the moving speed of the carriage 50 and the distance from the recording medium P, the light source 90A is disposed at a position from which the first light source 90A can emit active radiation so that the droplets can be irradiated within 500 ms after having landed on the recording medium P.

As will be described below, bleeding in the image formed on the recording medium can be reduced by irradiating the droplets of the radiation-curable ink composition with active radiation from the first light source 90A within 500 ms after the droplets have landed. However, if the droplets are irradiated with active radiation from the first light source 90A after 500 ms has elapsed from when the droplets have landed, bleeding may occur in the image formed on the recording medium.

The first light source 90A may be provided with a light source control circuit (not shown). Thus, the on-off state of the first light source 90A can be controlled, so that the intensity and time of the active radiation can be appropriately adjusted.

Preferably, either a light emitting diode (LED) or a laser diode (LD) is used for the first light source 90A. Since these devices do not require a filter or the like unlike mercury lamps, metal halide lumps and other lumps, the increase in size of the first light source 90A can be avoided. Since the filter is not used, the active radiation is not absorbed by the filter, and accordingly, the intensity of the active radiation is not reduced by the absorption. Thus, the radiation-curable ink composition can be efficiently cured.

The first light sources 90A to 90H may emit active radiations having the same wavelength, or active radiations having different wavelengths. If an LED or a LD is used for a light source, the active radiation emitted from the light source can have a wavelength in the range of about 350 to 430 nm.

In FIG. 3, each first light source 90 includes an arrangement of a plurality of ultraviolet light emitting diodes (UV LEDs, designated by reference character D).

By providing the heads 52 with their respective light sources 90, the radiation-curable ink composition ejected from each head 52 can be irradiated with an active radiation having a wavelength suitable for the ink composition. Accordingly, the range of choices for the radiation-curable ink composition can be expanded.

Since the ink jet recording apparatus 20 of the present embodiment performs bidirectional printing, it is preferable that the first light source 90 be provided at both sides in the first direction MS of each head 52. On the other hand, for unidirectional printing, the first light source 90 may be provided at only one side of the head 52. In either case, the positions of the first light sources 90 are adjusted so that the first irradiation of the droplets (described later) can be performed within 500 ms after the droplets have landed. Also, the first irradiation performed within 500 ms is preferably completed within 500 nm after the droplets have landed.

1.1.3. Second Light Source

The second light source 100 used in the present embodiment can be moved in the first direction MS with the heads 52. The second light source 100 moves in the same manner as the heads 52, and thus description thereof is omitted.

The second light source 100 is disposed at a side in the recording medium transport direction SS of the arrangement of the heads 52, as shown in FIGS. 1, 3 and 4. In the present embodiment, the second light source 100 is disposed so as to cover a side surface of the carriage 50 along the first direction MS. However, the second light source 100 can be disposed in any position as long as all the droplets on the recording medium P can be irradiated with the active radiation from the second light source 100 after the droplets have been irradiated with the active radiation from the first light sources 90. For example, the second light source 100 may be provided on a part of the side surface of the carriage 50 along the first direction MS.

Preferably, the second light source 100 includes LEDs or LDs for the same reason as the first light sources 90. If an LED or a LD is used for a light source, the active radiation emitted from the light source can have a wavelength in the range of about 350 to 430 nm. If a plurality of second light sources 100 are used, the active radiations emitted from the light sources have the same wavelength or respective wavelengths.

In FIG. 3, the second light source 100 includes an arrangement of a plurality of UV LEDs (designated by reference character D). The second light source 100 may emit active radiations having different wavelengths. For example, the second light source may be divided into a plurality of regions emitting different radiations among regions. Thus, each radiation-curable ink composition can be irradiated with an active radiation having a wavelength suitable for the ink composition, and accordingly, the range of choices of the radiation-curable ink composition can be expanded.

In the recording apparatus 20 of the present embodiment, the second light source 100 is mounted in the carriage 50. However, it may be disposed to the recording medium transport direction SS side of the second light source 100, apart from the carriage 50.

1.1.4. Other Components

The ink jet recording apparatus 20 of the present embodiment may further include the following components.

In the ink jet recording apparatus 20, four independent heads 52A to 52D constitute a full color serial head unit, and each head 52 has a plurality of nozzle apertures 53. In the carriage 50 in which these heads 52 are mounted, cartridges 54 to 57 or ink containers charged with respective radiation curable ink compositions are mounted. The radiation-curable ink compositions in the cartridges 54 to 57 may contain the same constituents or different constituents. If the constituents are the same, their proportions may differ. For example, the ink compositions may have different hues from each other.

The ink jet recording apparatus 20 shown in FIG. 1 includes a motor 30 that transports the recording medium P in the transport direction SS, a platen 40, the carriage 50, and a carriage motor 60 that moves the carriage 50 in the first direction MS.

The carriage 50 is drafted by a traction belt 62 driven by the carriage motor 60, thereby moving along a guide rail 64. The heads 52, which are mounted in the carriage 50, are moved in the first direction MS together with the carriage 50.

Also, in the ink jet recording apparatus 20, a capping device 80 is provided at the home positions of the carriage 50 (on the right of FIG. 1). The capping device covers the surface having the nozzle apertures 53 during the suspension of the operation of the apparatus 20. When the carriage 50 has returned to the home position over the capping device 80 after the completion of a printing operation, the capping device 80 is automatically lifted by a mechanism (not shown) to cover the surfaces of the heads 52 in which the nozzle apertures 53 are formed.

1.1.5. Advantages

The ink jet recording apparatus 20 used in the ink jet recording method according to the present embodiment has a plurality of first light sources 90, each provided for each head 52. Accordingly, droplets of each ink composition can be irradiated at an optimal irradiation energy. Consequently, an image superior in glossiness and color density can be formed, and the bleeding in the image can be reduced.

Also, the ink jet recording apparatus 20 includes a plurality of heads 52, and these heads 52 have their respective first light sources 90. Accordingly, the wavelength of the radiation from the first light source 90 can be set according to the corresponding ink composition ejected from the head 52. Consequently, the range of choices of the radiation curable ink composition can be expanded.

The use of the ink jet recording apparatus 20 of the present embodiment allows continuous operation in the ink jet recording method described below, without using different apparatuses for some steps of the method.

1.2. Ink Jet Recording Method

An ink jet recording method according to an embodiment of the invention uses the above-described ink jet recording apparatus. In this method, droplets are ejected from a plurality of heads onto a recording medium (first step). The droplets are irradiated with active radiations from the first light sources within 500 ms after having landed on the recording medium (second step). In this step, the irradiation energy at which the droplets are irradiated is in the range of 5% to 10% of the energy $E_{90}$ at which the radiation-curable ink composition is 90% cured. The word "image" mentioned herein refers to a printed pattern defined by dots, including printed characters and solid patterns. The steps of the method will now be described in detail.

1.2.1. First Step

In this step, droplets of radiation-curable ink compositions are ejected from a plurality of heads onto a recording medium. In use of the ink jet recording apparatus 20, at least one of the heads 52A to 52D ejects a radiation-curable ink composition onto the recording medium P.

Preferably, the amount of droplets ejected from each head 52 in the first step is in the range of 1 to 20 pL. By controlling the amount of droplets in this range, the ejection stability can be enhanced and, thus, high-quality images can be formed.

1.2.2. Second Step

In the second step, the droplets are irradiated with an active radiation from the first light source 90 within 500 ms after having landed on the recording medium. The operation in the second step will be further described with reference to FIG. 2. In the following description, the heads 52 move in the direction indicated by arrow C (C direction).

First, droplets are ejected onto a recording medium P from the head 52A while the carriage 50 is being moved in the C direction. The droplets on the recording medium P are irradiated with the first active radiation from the corresponding first light source 90A by moving the carriage 50 in the C direction (first direction MS). If droplets are ejected from the heads 52B to 52D, the droplets of each head 52 are first irradiated with an active radiation from the first light source 90 disposed immediately to the B direction side of the head 52.

When the carriage 50 is moved in the B direction, the droplets of each head 52 are first irradiated with an active radiation from the first light source 90 disposed immediately to the C direction side of the head 52.

The first irradiation of the droplets on the recording medium P with active radiation is performed by the first light source 90 within a time in the range of 0 to 500 ms after the droplets ejected from the head 52 have landed on the recording medium P.

One of the functions of the first light source 90 is to induce the curing reaction of the droplets of the radiation-curable ink composition on the recording medium P. If droplets of a radiation-curable ink composition that cannot be absorbed by the recording medium P are not cured, the droplets can undesirably spread on the recording medium P, or come into contact with droplets of other ink compositions, thereby causing color mixing.

Accordingly, by first irradiating the droplets on the recording medium P with active radiation within the time described above, the radiation-curable ink composition is partially cured to prevent the droplets from undesirably spreading on the recording medium P, and from coming into contact with droplets of other ink compositions. Thus, bleeding can be reduced in the resulting image formed on the recording medium. In the description, the irradiation with active radiation may be referred to as "pinning".

However, if the first irradiation of the radiation-curable ink composition is performed after 500 ms has elapsed from when the droplets landed on the recording medium, the droplets spread undesirably widely and are then cured. The spread droplets are likely to come into contact with other different color droplets to be mixed to an undesired extent, thus causing bleeding in the image formed on the recording medium.

The irradiation of the droplets performed within 500 ms after the droplets have landed on the recording medium P is performed at an energy of 5% to 10% of the irradiation energy $E_{90}$ (mJ/cm$^2$) at which the radiation-curable ink composition can be 90% cured. By irradiating the droplets of the radiation-curable ink composition at an energy in this range within 500 ms after the droplets have landed, the resulting image can exhibit superior glossiness and high color density with bleeding reduced.

On the other hand, if the radiation energy of the irradiation performed within 500 ms is less than 5% of $E_{90}$, the droplets cannot be sufficiently cured by pinning. Consequently, the droplets can undesirably spread on the recording medium P or come into contact with droplets of other ink compositions to be mixed. Thus, bleeding may occur in the image formed on the recording medium P, and the resulting image may not be good. In addition, the radiation-curable ink composition may be repelled or aggregated on the recording medium P, thereby reducing the glossiness of the image.

In contrast, if the energy of the irradiation performed within 500 ms after the landing of the droplets is higher than 10% of E.sub.90, the droplets having landed on the recording medium P cannot appropriately spread and are cured as they are. Consequently, the glossiness of the resulting image may be reduced.

After the first irradiation, the same droplets may be further irradiated once or more within 500 ms after having landed. In this instance, if the total energy of irradiations of the same droplets performed within 500 ms after the landing is more than 10% of E.sub.90, the color density or glossiness of the resulting image may be reduced. This problem is caused by excessively curing the droplets at a short time (within 500 ms after the landing).

In the description herein, the irradiation energy $E_{90}$ (mJ/cm$^2$) at which a radiation-curable ink composition can be 90% cured refers to the irradiation energy at which the conversion of the polymerizable compound in the radiation-curable ink composition can reach 90%. When the conversion of the polymerizable compound in the radiation-curable ink composition comes to 90% or more, the radiation-curable ink composition is sufficiently cured to form a favorable image having a high rub fastness. The conversion can be obtained from the variation in absorbance of a specific peak in the absorption spectrum measured with a Fourier transform infrared spectrophotometer (FT-IR).

1.2.3. Third Step

In the ink jet recording method of the present embodiment, after the second step, the droplets may be further irradiated with active radiation after 500 ms has elapsed from the landing of the droplets (third step).

For example, this step may be performed by the second light source with the recording medium transported in the transport direction after the second step. As shown in FIG. 4, in the third step, the recording medium P is transported in the transport direction SS, and then the droplets that have been irradiated with the active radiation from the first light source 90 are further irradiated with an active radiation from the second light source 100.

One of the functions of the second light source 100 is to promote the curing reaction of the droplets of the radiation-curable ink composition on the recording medium P. The droplets of the radiation-curable ink composition can be fully cured by the third step.

Preferably, the irradiation in the third step is performed after 500 ms has elapsed from the landing of the droplets, from the viewpoint of fully curing the droplets. If the third step is performed within 500 ms after the droplets landed, only the surfaces of the droplets are excessively cured. Consequently, the color density or glossiness of the resulting image is likely to be reduced.

In this instance, preferably, the total energy of irradiations of the droplets with active radiation including the second step and the third step is more than or equal to $E_{90}$. Thus, the droplets of the radiation-curable ink composition can be sufficiently cured to enhance the rub fastness of the resulting image. If the total energy of irradiations of the droplets including the second and third steps is less than E.sub.90, the droplets cannot be sufficiently cured, and consequently, the rub fastness of the resulting image may be reduced.

In the present embodiment, the irradiation in the third step is performed by the second light source 100. However, any device can perform the third step without particular limitation, as long as the droplets can be irradiated after 500 ms has elapsed from the landing. For example, the third step may be performed by another first light source (for example, by the first light source provided for the adjacent head disposed to the first direction), or by a combination of the first light source and the second light source. If the total irradiation energy can reach $E_{90}$ or more by multiple irradiations from the first light sources, the second light source may not be provided.

The ink jet recording method of the present embodiment can form an image to a thickness in the range of 1 to 30 μm on the recording medium P. By forming an image to a thickness in this range, the recording medium P can be prevented from curing, and the wrinkles of the resulting image can be reduced. Thus favorable recorded matter can be produced.

In the ink jet recording method of the present embodiment, the irradiation energy of active radiation can be varied according to the radiation-curable ink composition by controlling the irradiation intensity or irradiation time.

By repeating the operations of the first to third steps, an image defined by droplets can be formed in a predetermined region on the recording medium P.

1.2.4. Advantages

In the ink jet recording method of the present embodiment, droplets on the recording medium P are irradiated with active radiation from the first light source at an irradiation energy of 5% to 10% of $E_{90}$ within 500 ms after having landed. This can prevent bleeding in the image formed on the recording medium P, and the resulting image can exhibit high glossiness and high color density.

1.3. Radiation-Curable Ink Composition

The heads of the ink jet recording apparatus used in the ink jet recording method of the present embodiment eject different radiation-curable ink compositions. The different radiation-curable ink compositions mean that at least either the constituents or the contents of the constituents differ among the ink compositions. Radiation-curable ink compositions used in the method of the present embodiment will now be described in detail.

1.3.1. Polymerizable Compound

The radiation-curable ink composition contains a polymerizable compound. Examples of the polymerizable compound include monofunctional monomers, bifunctional monomers, trifunctional monomers, urethane acrylate oligomers, and amino acrylates.

Monofunctional monomers include, but are not limited to, (2-methyl-2-ethyl-1,3-dioxolane-4-yl)methyl(meth)acrylate, (2-methyl-2-isobutyl-1,3-dioxolane-4-yl)methyl(meth) acrylate, phenoxyethyl(meth)acrylate, isobornyl(meth)acrylate, methoxy diethylene glycol mono(meth)acrylate, (meth) acryloyl morpholine, dicyclopentenyloxyethyl(meth) acrylate, dicyclopentenyl(meth)acrylate, dicyclopentanyl (meth)acrylate, isobornyl(meth)acrylate, trimethylolpropane formal mono(meth)acrylate, adamantyl(meth)acrylate, oxetane(meth)acrylate, and 3,3,5-trimethylcyclohexane(meth) acrylate. These may be used singly or in combination. The word "(meth)acrylate" used herein refers to an acrylate or a methacrylate.

Bifunctional monomers include, but are not limited to, alkylene glycol di(meth)acrylates and di(meth)acrylates having an alicyclic structure. Alkylene glycol di(meth)acrylates include ethylene glycol di(meth)acrylate, diethylene glycol di(meth)acrylate, dipropylene glycol di(meth)acrylate, tripropylene glycol di(meth)acrylate, 1,9-nonanediol di(meth)acrylate, polyethylene glycol di(meth)acrylate, tetraethylene glycol di(meth)acrylate, 1,6-hexanediol di(meth) acrylate, neopentyl glycol di(meth)acrylate, and 2-hydroxy-1,3-di(meth)acryloxypropane. Di(meth)acrylates having an alicyclic structure include tricyclodecane dimethanol di(meth)acrylate, dioxane glycol di(meth)acrylate, isocyanuric acid EO-modified di(meth)acrylate, dimethylol tricyclodecane di(meth)acrylate, and 1,3-adamantanediol di(meth) acrylate. These may be used singly or in combination.

Trifunctional monomers include, but are not limited to, trimethylolpropane tri(meth)acrylate, trimethylolpropane EO-modified tri(meth)acrylate, trimethylolpropane PO-modified tri(meth)acrylate, glycerin PO-modified tri (meth)acrylate, and isocyanuric acid EO-modified tri(meth) acrylate.

The polymerizable compound may be a N-vinyl compound. Examples of the N-vinyl compound include N-vinylformamide, N-vinylcarbazole, N-vinylacetamide, N-vinylpyrrolidone, N-vinylcaprolactam, and derivatives of these N-vinyl compounds.

The polymerizable compound may be an urethane oligomer. Urethane oligomers are compounds having at least one urethane bond and at least one radically polymerizable unsaturated double bond in their molecule. An oligomer used in the present embodiment is a molecule having a structure including a few repetitions, typically about two to twenty repetitions, practically or conceptually produced from a molecule having a small relative molecular weight (synonymous with molecular weight), and has a middling relative molecular weight.

The urethane oligomer may be a polyol or an oligomer produced by addition reaction of a polyisocyanate and a polyhydroxy compound. Also, examples of the urethane oligomer include polyester-based urethane acrylates, polyether-based urethane acrylates, polybutadiene-based urethane acrylates, and polyol-based urethane acrylates. For example, CN963J75, CN964, CN965, or CN966J75 (each available from SARTOMER) may be used as the urethane oligomer.

The polymerizable compound may be an amino acrylate. An amino acrylate may be produced by allowing a bifunctional (meth)acrylate to react with an amine compound.

Examples of the bifunctional acrylate include alkylene glycol di(meth)acrylates, such as propylene glycol di(meth) acrylate, 1,3-butylene glycol di(meth)acrylate, 1,4-butanediol di(meth)acrylate, 1,6-hexanediol di(meth)acrylate, 1,9-nonanediol di(meth)acrylate, and neopentyl glycol di(meth) acrylate; bisphenol alkylene oxide adduct di(meth)acrylates, such as bisphenol S ethylene oxide adduct di(meth)acrylate, bisphenol F ethylene oxide adduct di(meth)acrylate, bisphenol A ethylene oxide adduct di(meth)acrylate, thiobisphenol ethylene oxide adduct di(meth)acrylate, and brominated bisphenol A ethylene oxide adduct di(meth)acrylate; polyalkylene glycol di(meth)acrylates, such as polyethylene glycol di(meth)acrylate and polypropylene glycol di(meth) acrylate; and hydroxypivalic acid neopentyl glycol ester di(meth)acrylate.

Examples of the amine compound include monofunctional amine compounds, such as ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, nonylamine, n-decylamine, n-dodecylamine, n-tetradecylamine, n-hexadecylamine, n-octadecylamine, benzylamine, and phenethylamine; and polyfunctional amine compounds, such as diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylylenediamine, p-xylylenediamine, m-xylylenediamine, menthanediamine, bis(4-amino-3-methylcyclohexyl)methane, 1,3-diaminocyclohexane, isophorone diamine, and spiroacetal diamines. In addition, macromolecular polyfunctional amine compounds may be used, such as polyethyleneimines, polyvinylamines, and polyallylamines.

The content of the polymerizable compound in the radiation-curable ink composition is preferably 20% by mass or more, and more preferably in the range of 20% to 95% by mass.

1.3.2. Photopolymerization Initiator

The radiation-curable ink composition may contain a photopolymerization initiator. The photopolymerization initiator is a generic name of compounds having the function of initiating a copolymerization reaction of the above described reaction components by irradiating the radiation-curable ink composition on the recording medium with an active radiation.

Examples of the polymerization initiator include alkylphenone-based photopolymerization initiators, acylphosphine oxide-based photopolymerization initiators, titanocene-based photopolymerization initiators, thioxanthone-based photopolymerization initiators, and other known photopolymerization initiators. Preferably, the photopolymerization initiator is compatible with the above-described reaction components. For example, it may be a molecular fragmentation type, such as 2,4,6-trimethylbenzoyldiphenylphosphine oxide or bis (2,4,6-trimethylbenzoyl) phenylphosphine oxide having wide range of light absorption characteristics, or a hydrogen abstraction type such as diethylthioxanthone. The reason why acylphosphine oxide-based photopolymerization initiators are preferred is that the structure of their chromophores is significantly transformed after the photofragmentation, and accordingly that a short wavelength representing an absorption called photo-bleaching is observed. In addition, acylphosphine oxide-based photopolymerization initiators absorb a wide range of light from UV light to visible light, but they are difficult to turn yellow and can be fully cured. Accordingly, they can be suitably used for transparent thick films or masking coatings containing a pigment. The reason why thioxanthone-based photopolymerization initiators are preferred is that they can react with oxygen remaining in the reaction system after photofragmentation to reduce the oxygen concentration in the system. As the oxygen concentration is reduced, the degree of radical polymerization inhibition can be reduced. Accordingly, the surface curability can be increased. In particular, it is preferable that an acylphosphine oxide-based photopolymerization initiator and a thioxanthone-based photopolymerization initiator be combined. Although these photopolymerization initiators may be used singly, their advantages can be maximized by combining at least two of them.

Preferably, the polymerization initiator content in the radiation-curable ink composition is 1% to 20% by mass, and more preferably 5% to 15% by mass.

1.3.3. Other Additives

The radiation-curable ink composition used in the present embodiment may further optionally contain other additives, such as a pigment, a dispersant, a slipping agent, a photosensitizer, and a polymerization inhibitor.

Although the radiation-curable ink composition can be used as a clear ink without adding other additives, a pigment may be added. The pigment may be, but is not limited to, an inorganic pigment or an organic pigment. Exemplary inorganic pigments include titanium oxide, iron oxide, and carbon blacks produced by known methods, such as the contact method, the furnace method, and the thermal method. Exemplary organic pigments include azo pigments, such as azo lake, insoluble azo pigments, condensed azo pigments, and chelate azo pigments; polycyclic pigments, such as phthalocyanine pigments, perylene pigments, perinone pigments, anthraquinone pigments, and quinophthalone pigments; and nitro pigments, nitroso pigments, and aniline black.

For example, C. I. Pigment Black 7 can be used as a carbon black. This can be available as No. 2300, No. 900, MCF88, No. 33, No. 40, No. 45, No. 52, MA7, MA8, MA100 and No. 2200B from Mitsubishi Chemical; as Ravens 5750, 5250, 5000, 3500, 1255 and 700 from Columbian Chemicals; as Regals 400R, 330R and 660R, Mogul L and Mogul 700, and Monarchs 800, 880, 900, 1000, 1100, 1300 and 1400 from Cabot; as Color Blacks FW1, FW2, FW2V, FW18 and FW200, Color Blacks 5150, S160 and 5170, Printexes 35, U, V and 140U, and Special Blacks 6, 5, 4A and 4 from Degussa.

Pigments that can be used for a yellow radiation-curable ink composition include C. I. Pigment Yellows 1, 2, 3, 12, 13, 14, 16, 17, 73, 74, 75, 83, 93, 95, 97, 98, 109, 110, 114, 120, 128, 129, 138, 150, 151, 154, 155, 180, 185 and 213.

Pigments that can be used for a magenta radiation-curable ink composition include C. I. Pigment reds 5, 7, 12, 48(Ca), 48(Mn), 57(Ca), 57:1, 112, 122, 123, 168, 184, 202 and 209, and C. I. Pigment Violet 19.

Pigments that can be used for a cyan radiation-curable ink composition include C. I. Pigment Blues 1, 2, 3, 15:3, 15:4, 16, 22 and 60.

Pigments that can be used for a green radiation-curable ink composition include C. I. Pigment Greens 7, 8 and 36.

Pigments that can be used for an orange radiation-curable ink composition include C. I. Pigment Oranges 51 and 66.

Pigments that can be used for a white radiation-curable ink composition include basic lead carbonate, zinc oxide, titanium oxide, and strontium titanate.

Preferably, the pigment used in the ink composition has an average particle size in the range of 10 to 200 nm, and more preferably in the range of 50 to 150 nm.

Preferably, the pigment content in the radiation-curable ink composition is in the range of 0.1% to 25% by mass, and more preferably in the range of 0.5% to 15% by mass.

The radiation-curable ink composition may contain a dispersant so that the pigment can be sufficiently dispersed. Dispersants that can be used in the radiation-curable ink composition include polymer dispersants, such as Solsperses 3000, 5000, 9000, 12000, 13240, 17000, 24000, 26000, 28000 and 36000 (each produced by Lubrizol), and Discoals N-503, N-506, N-509, N-512, N-515, N-518 and N-520 (each produced by Dai-Ichi Kogyo Seiyaku).

The radiation-curable ink composition may contain a slipping agent. Preferably, the slipping agent is a silicone surfactant, and more preferably it is a polyester-modified silicone or a polyether-modified silicone. Exemplary polyester-modified silicones include BYK-347, BYK-348. BYK-W3500, BYK-3510, and BYK-3530 (each produced by BYK Japan), and exemplary polyether-modified silicones include BYK-3570 (produced by BYK Japan).

The radiation-curable ink composition may contain a photosensitizer. Photosensitizers that can be used in the present embodiment include amine compounds, such as aliphatic amines, amines having aromatic groups, piperidine, reaction products of epoxy resin and amine, and triethanolamine triacrylate; urea compounds, such as allylthioureas and o-tolylthiourea; sulfur compounds such as sodium diethyldithiophosphate and soluble aromatic sulfonates; nitrile compounds, such as N,N-diethyl-p-aminobenzonitrile; phosphorus compounds, such as tri-n-butylphosphine and sodium diethyldithiophosphide; nitrogen compounds, such as Michler's ketone, N-nitrosohydroxylamine derivatives, oxazolidine compounds, tetrahydro-1, 3-oxazine compounds, and condensates of formaldehyde or acetaldehyde and diamine; and chlorine compounds, such as carbon tetrachloride and hexachloroethane.

The radiation-curable ink composition may contain a polymerization inhibitor. The polymerization inhibitor may be hydroquinone, benzoquinone or p-methoxyphenol.

1.3.4. Properties (1) Viscosity

The radiation-curable ink composition used in the present embodiment preferably has a viscosity of 5 to 50 mPa·s, more preferably 20 to 40 mPa·s, at 20° C. When the radiation-curable ink composition has a viscosity in the above range at 20° C., an appropriate amount of radiation-curable ink composition can be ejected through the nozzles, and the deviation or scattering of the ink composition can be reduced. Thus, such an ink composition is suitable for use in ink jet recording apparatuses. The viscosity of the ink composition is measured with a viscoelasticity meter MCR-300 (manufactured by Pysica) by increasing the shear rate to 10 to 1000 at 20° C. and reading the indication at a shear rate of 200.

(2) Surface Tension

Preferably, the radiation-curable ink composition has a surface tension in the range of 20 to 30 mN/m at 20° C. When the radiation-curable ink composition has a surface tension in this range, it cannot easily wet water-repellent nozzles. Consequently, an appropriate amount of radiation-curable ink composition can be ejected through the nozzles, and the deviation or scattering of the ink composition can be reduced. Thus, such an ink composition is suitable for use in ink jet recording apparatuses. The surface tension can be measured on a wet platinum plate at a temperature of 20.degree. C. with an automatic surface tensiometer CBVP-Z (manufactured by Kyowa Interface Science).

(3) Irradiation Energy $E_{90}$ at which Radiation-Curable Ink Composition can be 90% Cured Preferably, $E_{90}$ of the radiation-curable ink composition is in the range of 120 to 300 mJ/m². Radiation-curable ink compositions that can be 90% cured at an irradiation energy in this range can be used in the ink jet recording apparatus 20. $E_{90}$ can be measured with an FT-IR MAGNA-IR 860 Nicolet (manufactured by Thermo Fisher Scientific K.K.).

1.4. Recording Medium

Preferably, the recording medium used in the ink jet recording method of the present embodiment is ink-non-absorbent or ink-low-absorbent. The ink jet recording method of the present embodiment can form good images even on ink-non-absorbent or ink-low-absorbent recording media.

The ink-non-absorbent recording medium may be a plastic film not surface-treated for ink jet printing (not having an ink-absorbing layer), or a paper sheet or any other medium coated or bonded with a plastic film. The plastic here may be polyvinyl chloride, polyethylene terephthalate, polycarbonate, polystyrene, polyurethane, polyethylene, or polypropylene. The ink-low-absorbent recording medium may be art paper, coated paper, or matte paper.

The ink-non-absorbent and ink-low-absorbent recording media used herein refer to recording media that can absorb water in an amount of 10 mL/m.sup.2 or less for a period of 30 ms.sup.½ from the beginning of contact with water, measured by Bristow's method. Bristow's method is broadly used for measuring liquid absorption for a short time, and Japan Technical Association of the Pulp and Paper Industry (JAPAN TAPPI) officially adopts this method. Details of this method are specified in Standard No. 51 (Paper and Paperboard—Liquid absorption Test Method—Bristow's Method (in Japanese)) of JAPAN TAPPI Paper and Pulp Test Methods edited in 2000 (in Japanese). The ink-non-absorbent or ink-low-absorbent recording medium hereinafter may be simply referred to as a plastic medium.

1.5. Recorded Material

The recorded material according to an embodiment of the invention is a record formed by the above-described ink jet recording method. Since the image on the recording medium has been formed by the above-described ink jet recording method, it exhibits superior glossiness and high color density with bleeding reduced.

2. Second Embodiment

Figure 5:
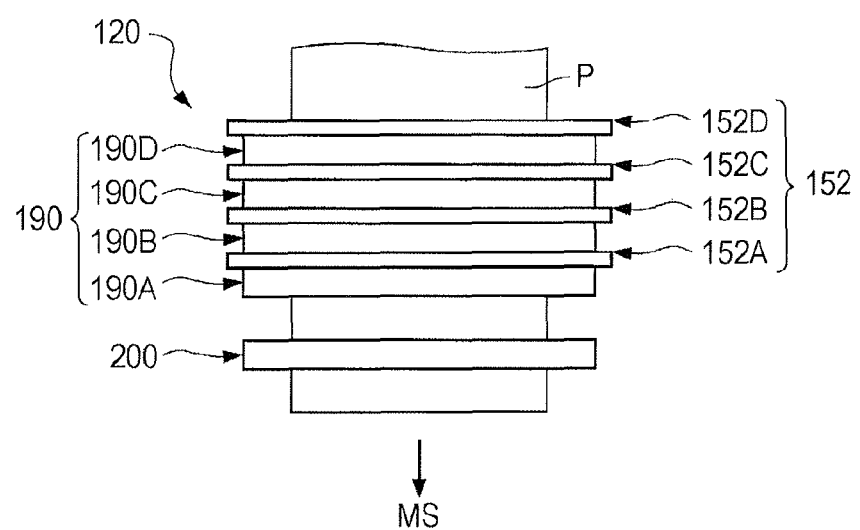
FIG. 5 is a schematic top view of an ink jet recording apparatus that can be used in an ink jet recording method according to a second embodiment.

FIG. 5 is a schematic top view of an ink jet recording apparatus 120 according to a second embodiment of the invention. The ink jet recording apparatus 120 of the second embodiment is different from that of the first embodiment in that it is a so-called line ink jet printer.

More specifically, the ink jet recording apparatus 120 of the second embodiment includes a plurality of heads 152 (152A to 152D) arranged as shown in FIG. 5. The heads 152 are disposed in parallel with each other in the first direction. The length (in the direction perpendicular to the direction in which the recording medium P is transported) of each head 152 is larger than the width of the recording medium P. The first light sources 190 (190A to 190D) are disposed to the first direction (MS) side of the respective heads 152. The length (in the direction perpendicular to the direction in which the recording medium P is transported) of each first light source 190 is larger than the width of the recording medium P. The ink jet recording apparatus 120 may include a second light source 200. The second light source 200 may be disposed to the first direction (MS) side of the arrangement of the heads 152A to 152D and their respective first light sources 190A to 190D. The other parts are the same as in the ink jet recording apparatus 20 of the first embodiment, and thus description thereof is omitted.

The ink jet recording apparatus 20 of the first embodiment is of serial type. In the ink jet recording method using this type, droplets are ejected on a recording medium P being transported in the direction perpendicular to the first direction MS (transport direction SS) and are irradiated with active radiation while the carriage 50 is reciprocally, moved along the first direction MS, thereby forming an image on the recording medium P.

On the other hand, the ink jet recording apparatus 120 of the second embodiment is of line type. In the line ink jet recording apparatus, the heads have larger length than the width of the recording medium P so that droplets can be ejected onto the recording medium P to form an image without moving the heads. In the ink jet recording method of the second embodiment, the heads 152A to 152D eject droplets onto the recording medium P, and then the recording medium P is transported in the first direction MS. The droplets are irradiated with an active radiation from the first light source 190 disposed to the recording medium transport direction side of the corresponding head 152, thereby forming an image. After being irradiated with the active radiation from the corresponding first light source 190, the droplets may be further irradiated with an active radiation from the second light source 200. Both irradiations can be performed under the same conditions as in the ink jet recording method of the first embodiment, and thus description thereof is omitted.

3. Examples

The invention will be further described with reference to specific Examples. However, it is not limited to the Examples.

3.1. Preparation of Pigment-Dispersed Liquid

A monofunctional monomer phenoxyethyl acrylate was added to 18 parts by mass of a black pigment as a coloring agent and 1.2 parts by mass of a dispersant to a total of 100 parts by mass, and the materials were stirred to prepare a mixture. The mixture was sufficiently blended for 6 hours in a sand mill (produced by Yasukawa Seisakusho) with zirconia beads of 1.5 mm in diameter. The zirconia beads were removed with a separator to yield a black pigment-dispersed liquid.

A cyan pigment-dispersed liquid was prepared using 12 parts by mass of a cyan pigment as a coloring agent in the same manner as the black pigment-dispersed liquid. A magenta pigment-dispersed liquid was prepared using 30 parts by mass of a magenta pigment as a coloring agent in the same manner as the black pigment-dispersed liquid. A yellow pigment-dispersed liquid was prepared using 48 parts by mass of a yellow pigment as a coloring agent in the same manner as the black pigment-dispersed liquid.

3.2. Preparation of Radiation-Curable Ink Composition

Polymerizable compounds, photopolymerization initiators, a slipping agent, and a polymerization inhibitor are mixed and completely dissolved, according to the composition (on a mass basis) shown in Table 1, and the black pigment-dispersed liquid was dropped into this solution to a concentration shown in Table 1 with stirring. Then, the resulting composition was stirred for 1 hour at room temperature, and filtered through a membrane filter of 5 .mu.m in pore size to yield a black radiation-curable ink composition. A cyan radiation-curable ink composition, a magenta radiation-curable ink composition, and a yellow radiation-curable magenta ink composition were prepared in the same manner.

The constituents shown in Table 1 are as follows:
(1) Polymerizable Compound
  Phenoxy acrylate (V #192, produced by Osaka Organic Chemical Industry)
  Dicyclopentenyloxyethyl acrylate (FA-512ASL, produced by Hitachi Chemical)
  Dicyclopentenyl acrylate (FA-511ASL, produced by Hitachi Chemical)
  N-vinyl caprolactam (N-vinyl caprolactam, produced by BASF)
  Tripropylene glycol diacrylate (APG-200, produced by Shin-Nakamura Chemical)
(2) Polymerization Inhibitor
  p-Methoxyphenol (Kanto Chemical)
(3) Slipping Agent
  BYK-UV3500 (polydimethylsiloxane having a polyether-modified acrylic group, produced by BYK Japan)
(4) Photopolymerization Initiator
  IRGACURE 819 (bis(2,4,6-trimethylbenzoyl)phenylphosphine oxide, produced by BASF Japan)

More specifically, peak height $A_0$ at 810 cm$^{-1}$ before the irradiation and peak height $A_t$ at 810 cm$^{-1}$ after the irradiation were obtained from IR spectra, and the cure degree was calculated from the following equation (1):

$$\text{Cure degree (\%)} = 100 \times (1 - A_t/A_0) \quad (1)$$

Irradiation energy $E_{90}$ (mJ/cm$^2$) at which the radiation-curable ink composition can be 90% cured was determined by measuring the cure degree. The values of $E_{90}$ of the radiation-curable ink compositions are shown in Table 1.

The measurement of irradiation energy was performed at the same distance from the recording medium as in the following Examples, using an UV LED having an active peak wavelength of 395 nm (the same light source as the first light source used in the Examples). Irradiation energies (mJ/cm.sup.2) were calculated as a product of the irradiation intensity (mW/cm.sup.2) at a surface irradiated by the UV LED and the time (s) for which the irradiation had been continued. Irradiation intensity was measured with a UV intensity meter UM-10 and a light receiver UM-400 (produced by Konica Minolta Sensing).

TABLE 1

| Radiation curable ink composition | | Black (K) | Cyan (C) | Magenta (M) | Yellow (Y) |
|---|---|---|---|---|---|
| (1) Polymerizable compound (mass %) | Phenoxyethyl acrylate | 36.50 | 37.50 | 34.50 | 31.50 |
| | Dicyclopentenyloxyethyl acrylate | 20.00 | 20.00 | 20.00 | 20.00 |
| | Dicyclopentenyl acrylate | 10.00 | 10.00 | 10.00 | 10.00 |
| | N-vinylcaprolactam | 10.00 | 10.00 | 10.00 | 10.00 |
| | Tripropylene glycol diacrylate | 10.00 | 10.00 | 10.00 | 10.00 |
| (2) Polymerization inhibitor (mass %) | p-Methoxyphenol | 0.20 | 0.20 | 0.20 | 0.20 |
| (3) Slip agent (mass %) | BYK-UV3500 | 0.10 | 0.10 | 0.10 | 0.10 |
| (4) Photopolymerization initiator (mass %) | Irgacure819 | 5.00 | 5.00 | 5.00 | 5.00 |
| | DAROCURE TPO | 4.00 | 4.00 | 4.00 | 4.00 |
| | DETX-S | 1.00 | 1.00 | 1.00 | 1.00 |
| (5) Dispersant (mass %) | Solsperse3600 | 0.20 | 0.20 | 0.20 | 0.20 |
| (6) Pigment (mass %) | MICROLITH-WA Black C-WA | 3.00 | — | — | — |
| | IRGALITE BLUE GLVO | — | 2.00 | — | — |
| | CROMOPHTAL PinkPT(SA) GLVO | — | — | 5.00 | — |
| | IRGALITE YELLOW LBG | — | — | — | 8.00 |
| | Total (mass %) | 100.00 | 100.00 | 100.00 | 100.00 |
| | $E_{90}$ (mJ/cm$^2$) | 300 | 120 | 200 | 250 |

DAROCUR TPO (2,4,6-trimethylbenzoyl diphenyl phosphine oxide, produced by BASF Japan)
KAYACURE DETX-S (2,4-diethylthioxanthone, produced by Nippon Kayaku)
(5) Dispersant
  Solsperse 36000 (produced by LUBRIZOL)
(6) Pigment
  MICROLITH-WA Black C-WA (black pigment, produced by BASF Japan)
  IRGALITE BLUE GLVO (cyan pigment, produced by BASF Japan)
  CROMOPHTAL PinkPT (SA) GLVO (magenta pigment, produced by BASF Japan)
  IRGALITE YELLOW LBG (yellow pigment, produced by BASF Japan)
3.3. Measurement of $E_{90}$ of Radiation-Curable Ink Composition Irradiation energy $E_{90}$ (mJ/cm$^2$) of the active radiation at which the radiation-curable ink composition can be 90% cured was determined from peaks at 810 cm.sup.−1 in the absorption spectra of the radiation-curable ink composition before and after the irradiation, measured with an FT-IR "MAGNA-IR 860 Nicolet" (manufactured by Thermo Fisher Scientific).

3.4. Ink Jet Recording Apparatus
For evaluations, the following ink jet recording apparatuses were used.
(1) First Recording Apparatus
An ink jet printer PX-G5000 (manufactured by Seiko Epson) was remodeled to the same structure as the ink jet recording apparatus 20 of the first embodiment. More specifically, PX-G5000 was remodeled so as to have four independent heads, their respective first light sources, each disposed at both side of the corresponding head, and a second light source disposed to the recording medium transport direction side of the heads.

The ink cartridges of the heads were charged with the respective ink compositions prepared in the above "3. 2. Preparation of Radiation-Curable Ink Composition" so that the heads could eject different color ink compositions.

UV LEDs were used for the first light sources and the second light source so that droplets of the radiation-curable ink composition could be irradiated with UV light having a wavelength of 395 nm.

The time from when droplets had landed on the recording medium until the droplets were irradiated with active radiation from the first light source was able to be controlled by adjusting the moving speed of the head and the distance in the head moving-direction between the head and the first light source. For example, when the head moving speed V1 was set at 1 m/s and the distance L1 between the head and the first light source was set at 50 mm, the time T1 from when droplets had landed on the recording medium until the droplets were irradiated by the first light source was 50 ms. When V1 was set at 0.1 m/s and L1 was set at 50 mm, time T1 was 500 ms.

In the examples below, the ink jet printer remodeled as above is simply called the first recording apparatus.

(2) Second Recording Apparatus

An ink jet printer PX-G5000 (manufactured by Seiko Epson) was remodeled into the following structure. More specifically, PX-G5000 was remodeled so as to have a single head, first light sources disposed at both sides of the head, and a second light source disposed to the recording medium transport direction side of the head.

Four ink cartridges were loaded in the head so as to be arranged in parallel in the head-moving direction. The ink cartridges were charged with the respective radiation-curable ink compositions prepared in "3. 2. Preparation of radiation-curable ink composition". Thus the single head can eject four color ink compositions. In the examples, the cyan, magenta, yellow and black ink compositions were placed in that order in the head-moving direction.

As the result of this arrangement of the ink cartridges, the ink cartridges of the cyan ink composition and the black ink composition were closest to either of the first light sources.

The distance between the nozzles (provided to the head) through which the cyan ink composition was ejected and the first light source was 50 mm. The distance between the nozzles through which the cyan ink composition was ejected and the nozzles through which the black ink composition was ejected was 100 mm. As a result, when the moving speed of the carriage was set at 1 m/s, the droplets ejected from the nozzles of each color ink composition were irradiated with an active radiation from the corresponding first light source within a time of 50 to 150 ms.

UV LEDs were used for the first light sources and the second light source so that droplets of the radiation-curable ink compositions could be irradiated with UV light having a wavelength of 395 nm.

In the examples below, the ink jet printer remodeled as above is simply called the second recording apparatus.

When the first recording apparatus is used, the conditions of the first irradiation can be set according to the ink compositions. When the second recording apparatus is used, all the ink compositions are irradiated under the same conditions.

3.5. Evaluations 3.5.1. Preparation of Recorded Materials

Droplets of the radiation-curable ink compositions were ejected onto a PET film from the first recording apparatus or the second recording apparatus at room temperature and normal pressure so that the cyan (C), magenta (M), yellow (Y) and black (K) ink compositions would come into contact with each other, and the droplets were irradiated with UV light from the first light sources. Then, the PET film was transported and the droplets were further irradiated with UV light from the second light source.

The above operation was repeated at least two times, and thus a recorded material was prepared in which a solid pattern of the C, M, Y and K colors in contact with each other was printed on the PET film. The printing was performed at a resolution of 720.times.720 dpi, and the mount of droplets was 14 pL. Samples of Examples 1 to 3, Comparative Examples 1 to 6 and Reference Example were prepared for evaluation. However, the solid pattern of the sample of Comparative Example 7 was formed with only the magenta ink composition without ejecting other ink compositions.

In Examples 1 to 3, Reference Example and Comparative Example 1, the distance between the first light sources respectively provided to two adjacent heads between the two heads was controlled so that the time from when droplets ejected from one head has landed on the recording medium until the droplets are irradiated with an active radiation from the first light source provided for another head would be 500 ms or more.

The irradiation intensity of the first light sources was constant in each of Examples, Comparative Examples and Reference Example. Accordingly, the irradiation energy $E_1$ of the first irradiation of droplets was adjusted by partially covering with a shade film the irradiation surface of the first light source that would first irradiate the droplets so that the irradiation of a specific point on the recording medium by the first light source could continue for a predetermined time.

3.5.2. Bleeding Test

The contact portions of one color with the other colors in the recorded material prepared as above were observed for bleeding. The evaluation criteria were as follows. It can be considered that samples determined to be good had favorable images without bleeding. [0179] Good: no bleeding to other colors was observed. [0180] Fair: Bleeding to other colors was observed to some extent. [0181] Bad: Bleeding to other colors was observed.

3.5.3. Glossiness

The specular gloss of the recorded material at 60 degrees was measured for each color accordance with JIS Z8741, using a glossimeter MULTI Gloss 268 (manufactured by Konica Minolta). The evaluation criteria were as follows. Samples exhibiting gloss were determined to be A or B.

A: Glossiness≥70
B: 50≤Glossiness<70
C: 30≤Glossiness<50
D: Glossiness<30

3.5.4. Color Density

The optical density (OD value) of the recorded material was measured for each color with a colorimeter (Spectrolino, manufactured by Gretag Macbeth). The evaluation criteria were as follows. It can be considered that samples exhibiting an OD value of 1.8 or more had favorable images having superior color developability.

OD≥1.8: has high color density and good color developability.

OD<1.8: has low color density and poor color developability.

3.5.5. Cure Degree

The cure degree was obtained by comparing the peaks at 810 cm.sup.−1 in absorption spectra of the vinyl group of the radiation-curable ink composition before and after being irradiated with active radiation, using a FT-IR MAGNA-IR 860 Nicolet manufactured by Thermo Fisher Scientific.

More specifically, the cure degree was calculated from equation (1) in the same manner as described in "3. 3. Measurement of $E_{90}$ of Radiation-curable Ink Composition". In samples showing a cure degree of 90% or more, the image of the recorded material was sufficiently cured.

3.5.6. Rub Fastness

After being allowed to stand at 20.degree. C. for 16 hours, the recorded material was subjected to a test with a Gakushin-type rubbing tester AB-301 (manufactured by Tester Sangyo) by observing the surface of the image after rubbing the recorded material against a rubber with a white cotton rubbing cloth (Kanakin #3) 100 times at a load of 500 g. The evaluation criteria were as follows. It can be considered that samples determined to be good had images having high rub fastness.

Good: No rubbing trail was observed in the surface of the image.

Fair: A rubbing trail was observed in the surface of the image.

Bad: The image was separated from the recording medium to expose the surface of the medium.

4. Evaluation Results

Evaluation results are shown in Table 2.

droplets of all the ink compositions with active radiation from the first light sources, the droplets were further irradiated at an energy of $E_{90}$ or more by the second light source. Consequently, images having high glossiness, high color developability and high rub fastness without causing bleeding were produced in the recorded materials of Examples 1 to 3. In Examples 1 and 2, the head moving speed V1 was adjusted to 0.2 m/s, and the distance L1 between the head and the first light source was adjusted to 10 mm. In Example 3, V1 was adjusted to 0.1 m/s, and L1 was adjusted to 50 mm.

In Comparative Example 1, the recorded material was prepared at a speed V1 of 0.1 m/s, at a distance L1 of 60 mm, using the first recording apparatus. However, the droplets of

TABLE 2

| | Recording apparatus | Time untie irradiation with first light source (ms) | Radiation curable ink composition | Irradiation energy E1 of first light source (mJ/cm$^2$) | E1/E$_{90}$ (%) | Irradiation energy of first light source (mJ/cm$^2$) | Bleeding | Glossiness | Color density | Cure degree (%) | Rub fastness |
|---|---|---|---|---|---|---|---|---|---|---|---|
| Example 1 | 1 | 50 | C | 6 | 5 | 300 | Good | A | 2.1 | 94 | Good |
| | | | M | 10 | 5 | 300 | Good | A | 2.0 | 92 | Good |
| | | | Y | 13 | 5 | 300 | Good | A | 2.0 | 91 | Good |
| | | | K | 15 | 5 | 300 | Good | A | 2.0 | 90 | Good |
| Example 2 | 1 | 50 | C | 10 | 8 | 300 | Good | B | 1.8 | 97 | Good |
| | | | M | 13 | 7 | 300 | Good | B | 1.8 | 95 | Good |
| | | | Y | 20 | 8 | 300 | Good | B | 1.9 | 93 | Good |
| | | | K | 25 | 8 | 300 | Good | B | 1.9 | 93 | Good |
| Example 3 | 1 | 500 | C | 6 | 5 | 300 | Good | A | 2.0 | 95 | Good |
| | | | M | 10 | 5 | 300 | Good | A | 2.0 | 94 | Good |
| | | | Y | 13 | 5 | 300 | Good | A | 2.1 | 92 | Good |
| | | | K | 15 | 5 | 300 | Good | A | 1.9 | 94 | Good |
| Comparative Example 1 | 1 | 600 | C | 6 | 5 | 300 | Bad | A | 2.0 | 92 | Good |
| | | | M | 10 | 5 | 300 | Bad | A | 2.0 | 91 | Good |
| | | | Y | 13 | 5 | 300 | Bad | A | 1.9 | 92 | Good |
| | | | K | 15 | 5 | 300 | Bad | A | 1.8 | 92 | Good |
| Comparative Example 2 | 2 | 50-150 | C | 6 | 5 | 300 | Good | A | 2.1 | 94 | Good |
| | | | M | 6 | 3 | 300 | Fair | C | 1.7 | 91 | Good |
| | | | Y | 6 | 2 | 300 | Bad | C | 1.6 | 91 | Good |
| | | | K | 6 | 2 | 300 | Bad | D | 1.4 | 90 | Good |
| Comparative Example 3 | 2 | 50-150 | C | 10 | 8 | 300 | Good | B | 1.8 | 94 | Good |
| | | | M | 10 | 5 | 300 | Good | A | 2.1 | 92 | Good |
| | | | Y | 10 | 4 | 300 | Fair | B | 1.8 | 90 | Good |
| | | | K | 10 | 3 | 300 | Bad | C | 1.6 | 90 | Good |
| Comparative Example 4 | 2 | 50-150 | C | 13 | 11 | 300 | Good | D | 1.6 | 94 | Good |
| | | | M | 13 | 7 | 300 | Good | B | 1.8 | 94 | Good |
| | | | Y | 13 | 5 | 300 | Good | A | 2.0 | 95 | Good |
| | | | K | 13 | 4 | 300 | Fair | A | 2.0 | 94 | Good |
| Comparative Example 5 | 2 | 50-150 | C | 15 | 13 | 300 | Good | D | 1.5 | 93 | Good |
| | | | M | 15 | 8 | 300 | Good | B | 1.8 | 94 | Good |
| | | | Y | 15 | 6 | 300 | Good | A | 1.9 | 92 | Good |
| | | | K | 15 | 5 | 300 | Good | A | 2.0 | 93 | Good |
| Comparative Example 6 | 2 | 50-150 | C | 25 | 21 | 300 | Good | D | 1.5 | 96 | Good |
| | | | M | 25 | 13 | 300 | Good | D | 1.6 | 97 | Good |
| | | | Y | 25 | 10 | 300 | Good | B | 1.8 | 96 | Good |
| | | | K | 25 | 8 | 300 | Good | B | 2.0 | 95 | Good |
| Comparative Example 7 | 1 | 50 | C | 12 | 6 | — | — | — | — | — | — |
| | | | M | 10 | 5 | 300 | — | D | 1.5 | 98 | Good |
| | | | Y | 12 | 6 | — | — | — | — | — | — |
| | | | K | — | — | — | — | — | — | — | — |
| Reference Example 1 | 1 | 50 | C | 6 | 5 | 200 | Good | A | 1.9 | 92 | Good |
| | | | M | 10 | 5 | 200 | Good | A | 1.8 | 90 | Good |
| | | | Y | 13 | 5 | 200 | — | — | — | 72 | Fair |
| | | | K | 15 | 5 | 200 | — | — | — | 63 | Bad |

The recorded materials of Examples 1 to 3, shown in Table 2, were prepared by using the first recording apparatus, and all the droplets having landed on the recording medium were irradiated with the first active radiation from the first light sources at an energy of 10% to 90% of $E_{90}$ within 500 ms. In Examples 1 to 3, after irradiating the the radiation curable ink compositions were not irradiated within 500 ms after having landed. Consequently, bleeding occurred in the image of the resulting recorded material.

In Comparative Examples 2 to 6, the recorded materials were prepared using the second recording apparatus. Therefore, the droplets were not always irradiated with active radiation under conditions suitable for each radiation-curable ink composition. It was not confirmed that good images were formed.

In Comparative Example 7, the recorded material was prepared at a head moving speed V1 of 0.2 m/s, at a distance L1 of 10 mm, using the first recording apparatus. The distances between the head for the magenta ink composition and the head of the yellow ink composition (adjacent to the head for the magenta ink composition), and between the head for the magenta ink composition and the head for the cyan ink composition were adjusted so that the time until the droplets ejected from the magenta head are irradiated by the first light source for the yellow head or cyan head would be within 500 ms from the landing. In Comparative Example 7, the heads other than the magenta head did not eject ink compositions. In this instance, the irradiation surfaces of the first light sources other than those for the yellow and cyan heads were partially covered with shade films to control the irradiation energy of the active radiation. Thus, the total irradiation energy of active radiation irradiating droplets within 500 ms after the landing was adjusted to more than 10% of $E_{90}$. More specifically, the droplets having landed on the recording medium were first irradiated with an active radiation at a irradiation energy of 10 mJ/cm.sup.2 (5% of $E_{90}$ of the magenta ink composition) from the first light sources for the magenta head, and were then irradiated with an active radiation at an irradiation energy of 12 mJ/cm.sup.2 (6% of $E_{90}$ of the magenta ink composition) from the first light source for the cyan head or yellow head. Thus, the droplets were irradiated with active radiations at an irradiation energy of 22 mJ/cm.sup.2 (11% of $E_{90}$ of the magenta ink composition) within 500 ms after having landed. The irradiation energy EI and the EI/$E_{90}$ value of Comparative Example 7 shown in Table 2 are for the magenta ink composition. Thus, the recorded material of Comparative Example 7 was prepared with the magenta ink composition ejected from the magenta head.

In Comparative Example 7, the ink composition ejected from the magenta head was irradiated with an active radiation from the first light source for the magenta head within 500 ms after the landing, and was further irradiated with another active radiation from the adjacent first light source within 500 ms. Hence, the droplets on the recording medium were irradiated at an irradiation energy of more than 10% of $E_{90}$ within 500 ms after the landing. Consequently, the image of the resulting recorded material was inferior in glossiness and color density.

On the other hand, the recorded material of Reference Example shown in Table 2 was prepared at the same V1 and at the same L1 as in Example 1, using the first recording apparatus. However, the irradiation energy of the active radiation from the second light source irradiating the droplets of the yellow and black ink compositions was less than $E_{90}$. Consequently, the image formed with the yellow ink composition and the black ink composition was not sufficiently cured. Since the image was not sufficiently cured, the rub fastness was so poor that tests for bleeding, glossiness and color density were not performed.

The invention claimed is:

1. An ink jet recording method using an ink jet recording apparatus including a first head that ejects droplets of first radiation-curable ink composition and a second head that ejects droplets of second radiation-curable ink composition, a first light source (A) and a first light source (B) that respectively emit first active radiation and a second light source that emits second active radiation to irradiate the droplets on a recording medium, and the second head being located at a leading side in a recording medium transport direction from the first head, the method comprising:
    ejecting the droplets of the first radiation-curable ink compositions from the first head onto the recording medium and ejecting the droplets of the second radiation-curable ink compositions from the second head onto the recording medium while the recording medium is transported in the recording medium transport direction, locations of the first head and the second head are fixed relative to a recording medium width direction perpendicular to the recording medium transport direction while the ink jet recording method is conducted;
    performing a first irradiation by:
        irradiating the droplets of the first radiation-curable ink composition with the first active radiation from the first light source (A) for a first time so as to partially cure the droplets of the first radiation-curable ink composition after the droplets of the first radiation-curable ink composition are landed on the recording medium; and
        irradiating the droplets of the second radiation-curable ink composition with the first active radiation from the first light source (B) for a first time so as to partially cure the droplets of the first radiation-curable ink composition after the droplets of the second radiation-curable ink composition are landed on the recording medium, the first light source (A) being located between the first head and the second head in the recording medium transport direction, the first light source (B) being located between the second head and the second light source in the recording medium transport direction; and
    performing a second irradiation to irradiate the droplets of the first and second radiation-curable ink compositions with the second active radiation from the second light source after the first irradiation, the second light source being located at the leading side in the recording medium transport direction from the first head and the second head, wherein
    the first radiation-curable ink composition and the second radiation-curable ink composition are different from each other,
    the first light source (A) and the first light source (B) respectively include an LED, and the LED emits the first active radiation in a wavelength range of 350 nm to 430 nm,
    an irradiation energy to irradiate the droplets of the first radiation-curable ink composition with the first active radiation from the first light source (A) is different from an irradiation energy to irradiate the droplets of the second radiation-curable ink composition with the first active radiation from the first light source (B),
    the each of the first and second radiation-curable ink compositions contains a photopolymerization initiator of 5% to 15% by mass, and
    the photopolymerization initiator contains an acylphosphine oxide-based photopolymerization initiator.

2. The method according to claim 1, wherein
    a total energy of irradiations of the droplets with the first and second active radiations including the first irradiation and the second irradiation is more than or equal to energy that is required for curing 90% of the first and second radiation-curable ink compositions.

3. The method according to claim 1, wherein
energy, which is required for curing 90% of the first and second radiation-curable ink compositions, is in a range of 120 to 300 mJ/cm$^2$.

4. The method according to claim 1, wherein
the acylphosphine oxide-based photopolymerization initiator contains bis (2,4,6-trimethylbenzoyl) phenylphosphine oxide.

5. The method according to claim 1, wherein
the first irradiation is performed by pinning the droplets of the first and second radiation-curable ink compositions, and
the second irradiation is performed by further curing the droplets of the first and second radiation-curable ink compositions.

6. The method according to claim 1, wherein
each of the first and second radiation-curable ink compositions is one of a black ink composition, a yellow ink composition, a cyan ink composition, and a magenta ink composition.

7. The method according to claim 1, wherein
the first irradiation is performed within 500 ms after the droplets have landed on the recording medium, and
the second irradiation is performed after 500 ms has elapsed from the landing of the droplets.

8. The method according to claim 1, wherein
the first and second radiation-curable ink compositions respectively contain thioxanthone-based photopolymerization initiators.

9. The method according to claim 1, wherein
the first and second radiation-curable ink compositions respectively contain phenoxyethyl(meth)acrylate in a range of 31.5% by mass or more relative to the total mass on the ink composition.

10. The method according to claim 1, wherein
the first and second radiation-curable ink compositions respectively contain N-vinylcaprolactam.

11. The method according to claim 1,
wherein the droplets of the first and second radiation-curable ink compositions are fully cured with the second active radiation from the second light source.

12. The method according to claim 1,
wherein an irradiation energy ratio of the first active radiation from the first light source (A) to the first active radiation from the first light source (B) is 2.5 times or less.

13. The method according to claim 1,
wherein each of the first and second radiation-curable ink compositions is one of a black ink composition and a non-black color ink composition, and
when the black ink composition and the non-black color ink composition are partially cured at a predetermined percentage by the first active radiation from the first light source (A) and the first light source (B), respectively, an irradiation energy to irradiate the black ink composition is larger than an irradiation energy to irradiate the non-black color ink composition.

14. The method according to claim 1,
wherein each of the first and second radiation-curable ink compositions is one of a cyan ink composition and a non-cyan ink composition, and
when the cyan ink composition and the non-cyan ink composition are partially cured at a predetermined percentage by the first active radiation from the first light source (A) and the first light source (B), respectively, an irradiation energy to irradiate the cyan ink composition is smaller than an irradiation energy to irradiate the non-cyan ink composition.

15. The method according to claim 1,
wherein widths of the first light source (A) and the first light source (B) and a width of the second light source in the recording medium width direction are larger than a width of the recording medium in the recording medium width direction.

16. The method according to claim 1,
wherein the irradiation energy to irradiate the droplets of the first radiation-curable ink composition with the first active radiation from the first light source (A) and the irradiation energy to irradiate the droplets of the second radiation-curable ink composition with the first active radiation from the first light source (B) are respectively in a range of 6 mJ/cm$^2$ to 25 mJ/cm$^2$.

* * * * *